United States Patent [19]
Trede et al.

[11] Patent Number: 6,089,616
[45] Date of Patent: Jul. 18, 2000

[54] RELEASABLE PLUG CONNECTOR WITH FITTING INDICATOR

[75] Inventors: Michael Trede, Rixheim; Jean-Martin Henlin, Waldighoffen, both of France

[73] Assignee: A. Raymond & Cie, France

[21] Appl. No.: 09/202,754

[22] PCT Filed: May 28, 1997

[86] PCT No.: PCT/EP97/02751

§ 371 Date: Dec. 16, 1998

§ 102(e) Date: Dec. 16, 1998

[87] PCT Pub. No.: WO97/48936

PCT Pub. Date: Dec. 24, 1997

[30] Foreign Application Priority Data

Jun. 20, 1996 [DE] Germany ............................ 196 24 524

[51] Int. Cl.$^7$ ................................................... F16L 35/00
[52] U.S. Cl. ............................. 285/93; 285/308; 285/321
[58] Field of Search ................................ 285/93, 308, 321

[56] References Cited

U.S. PATENT DOCUMENTS

| | | | |
|---|---|---|---|
| 4,925,217 | 5/1990 | Ketcham | 285/93 |
| 5,112,085 | 5/1992 | Busch et al. | 285/308 X |
| 5,378,024 | 1/1995 | Kumagai et al. | 285/321 X |
| 5,441,313 | 8/1995 | Kalahasthy | 285/93 |
| 5,779,278 | 7/1998 | Grooters et al. | 285/93 |

FOREIGN PATENT DOCUMENTS 547489  6/1993  European Pat. Off. ................. 285/93

*Primary Examiner*—Lynne H. Browne
*Assistant Examiner*—David E. Bochna
*Attorney, Agent, or Firm*—Gifford, Krass, Groh, Sprinkle, Anderson & Citkowski, P.C.

[57] ABSTRACT

An indicator device for use with a detachable plug assembly includes a pair of spaced apart rings joined together by a pair of elongated connecting portions. The connecting portions extend in an axial direction between the rings. The connecting portions each have a outwardly curved bridging strip portion extending between a pair of flexible webs. The rings are mounted between the plug housing and the flange on the tubular insert member so that the bridging strips bulge outwardly to form a loop when the insert member is fully inserted into the plug to indicate that the insert member is properly locked within the plug. The indicator device may be connected either to the plug housing or to the insert member prior to assembly.

8 Claims, 2 Drawing Sheets

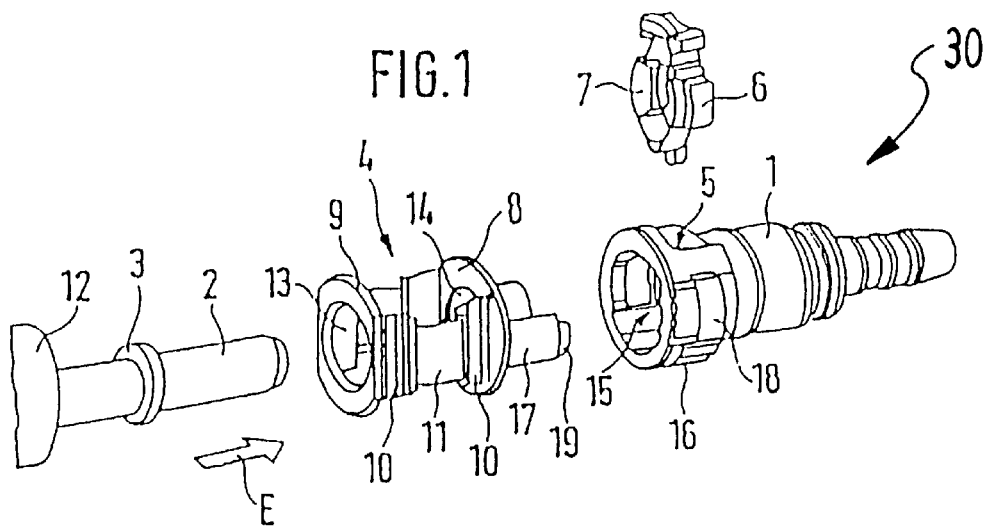
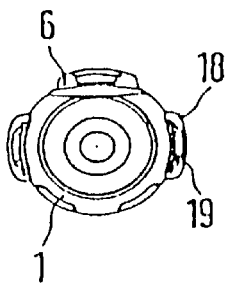
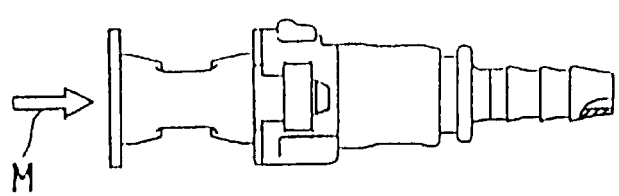
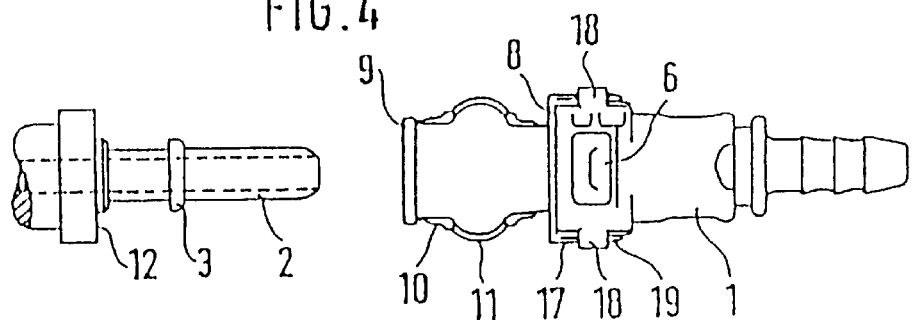
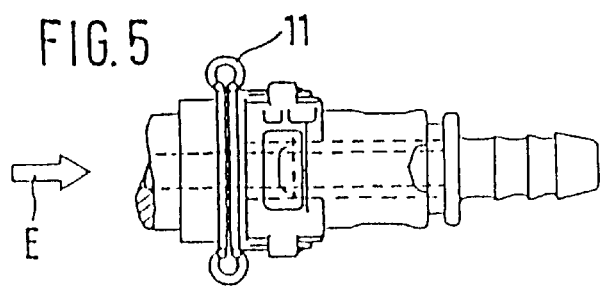

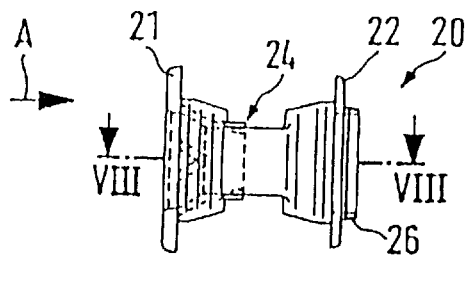
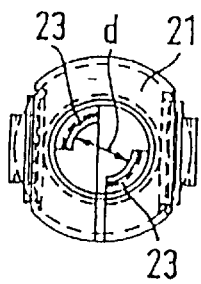
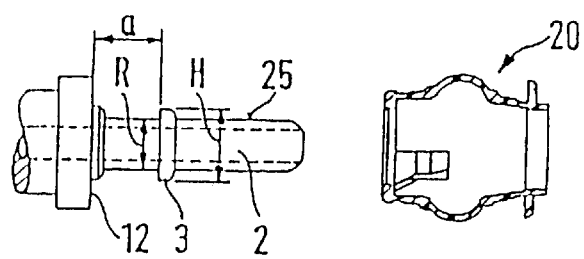
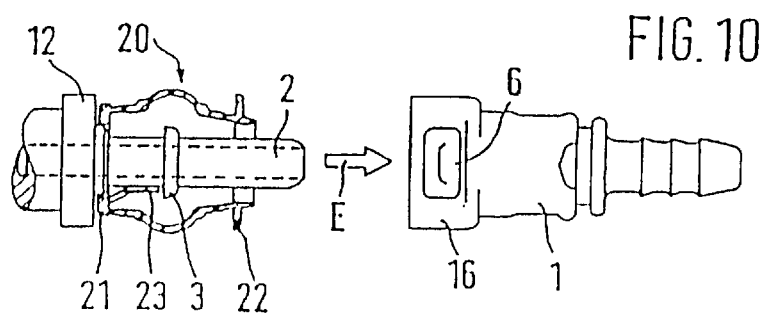
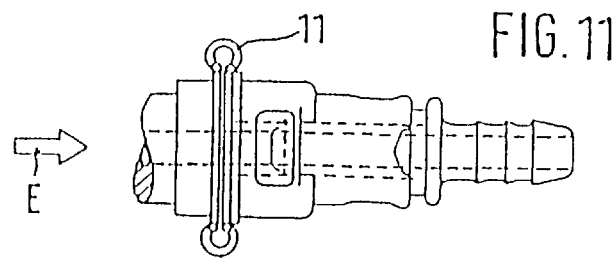

RELEASABLE PLUG CONNECTOR WITH FITTING INDICATOR

The invention pertains to a detachable plug connection with assembly indicator for connecting fluid lines corresponding to the preamble of claim 1.

When bringing together the insertion part and the plug housing it is particularly important that the retaining rib engages securely with the retaining element, so that the connection point is held absolutely secure. The engagement of the retaining rib on the spring-opening catch edges causes a click sound which confirms the production of the connection to the assembler, but this sound cannot be reliably perceived, depending on the noise level on the job, so that an absolute guarantee of the engagement of the insertion part is not assured.

In order to be certain of the engagement of the retaining rib during assembly, it is possible for the assembler to pull on the assembled plug connection to see whether it holds. There is no guarantee, however, that the assembler has actually performed this retention test, since it cannot be seen from the plug connection whether this check has actually been performed. There is thus nothing left for postmonitoring other than to pull once again on the plug connection.

In order to improve this monitoring, an indicator part consisting of two support rings spaced apart and two ridges connecting the support rings together, which can be positioned in front of the insertion opening of the housing, is provided in prior art according to EP 0 547 489 A1. While the one support ring contacts the front housing wall or its front end, the second support ring projects into the housing interior and is held by the connecting ridges in a waiting position directly behind the catch edges of the retaining element, specifically, at such a spacing that the retaining rib of the insertion part presses against the support ring of the insertion part shortly before engagement on the catch edges.

The connecting ridges are connected here to the support ring, the so-called indicator section, contacting the front of the housing entry by way of separable weakened areas which separate upon further penetration of the insertion part into the housing interior, at the latest upon engagement of the catch edges behind the retaining rib. The detachment of the indicator section is to serve as the indicator of a proper coupling between the insertion part and the plug housing, a bracket part projecting radially away from the indicator part being provided, with which the indicator part can be grabbed and removed from the connecting ridges after detachment.

The absence of the bracket with associated indicator part is thus certain proof that the plug connection has been closed; otherwise the assembler would not have been able to remove the bracket. But this type of monitoring also involves an additional expenditure of labor, so that at bottom nothing is gained by the expensive indicator part over and against pulling on the assembled insertion part.

The problem of the invention is to design or supplement the aforementioned plug connection such that a visually well-recognizable proof of the secure connection is obtained without additional manual measures.

This problem is solved according to the characterizing features of claim 1 in that the other support ring turned away from the housing wall can be supported on the insertion part on a flange behind the retaining rib, and the ridges on both rings are formed to spring open elastically and are mutually connected by bridging strips curved outwards which fold together to the outside when the insertion part is pressed in and project visibly beyond the housing wall.

The elastic spring ridges here offer the additional advantage that, in case of incomplete assembly, the plug housing is pressed away from the insertion part due to the restoring forces in the ridges, so that the assembler is immediately informed and can press the plug housing firmly back on again.

In order to ease the positioning of the indicator part between the insertion part and the plug housing, two possibilities are provided for preassembly.

In the embodiment according to claim 2, two retaining ridges running axially are formed on the outside of the support ring that can be connected to the housing wall, the front housing wall having corresponding retaining brackets in the introduction area, into which the retaining ridges can be introduced and engaged by means of catch tabs projecting radially outwards. In this way the indicator part can be connected without problems at the manufacturer's facility and the customer can immediately join the, preassembled unit to the insertion part.

In the other embodiment, according to claim 3, the support ring resting on the flange of the insertion part possesses at least two elastically expanding support ridges pointing in the direction of the other support ring, the length of which [ridges] corresponds to the spacing between the flange and the retaining rib, and an inside diameter which in the areas in front of the support edge is somewhat smaller than the tube diameter of the insertion part. Thereby the indicator part can be conveniently premounted on the insertion part and then put together with the plug housing at the customer's facility. An additional advantage of this embodiment consists in the fact that the overall length of the insertion part is not changed, because the indicator part is shorter than the total length of the tubular part.

The features cited in claims 4–6 relate to a practical embodiment and dimensioning of the support ridges mentioned in claim 3, so that these lie tightly against the tubular part in front of the retaining rib after pushing the indicator part onto the insertion part (claims 4 and 6) and so that the retaining element of the plug housing has sufficient space to reach behind the retaining rib (claim 5). Finally, it is provided according to claim 7 that the outwards-curved bridging strips are narrower and thus more flexible than the elastic ridges formed on the support ridges. This has the effect that the curved bridging strips close together into a circle upon folding up, without great expenditure of force.

Two embodiments of the invention are presented in the drawing and are to be described in greater detail below. Shown are:

FIG. 1, the main elements of the plug connection with an indicator part premounted on the plug housing before assembly;

FIG. 2, the plug housing with mounted indicator part in a side view;

FIG. 3, the plug housing with indicator part in a plan view the right;

FIG.4, the plug housing with mounted indicator part in a side view rotated by 90° with associated insertion part before being pressed in;

FIG. 5, the same plug housing with pressed-in insertion part and folded-together indicator part;

FIG. 6, another form of the indicator part, which can be premounted on the insertion part, in a side view;

FIG. 7, the same indicator part in a plan view in the direction of arrow A;

FIG. 8, a longitudinal section through the indicator part along line VIII—VIII in FIG. 6;

FIG. 9, the insertion part with indicator part before being pressed on;

FIG. 10, the insertion part with premounted indicator part before being pressed into the plug housing; and FIG. 11, the same assembly diagram with pressed-in insertion part and folded-together indicator part.

The plug connection represented in the figures serves for the detachable connection of fluid lines, in particular, fuel lines in automobile manufacturing. It consists in general of a cylindrical plug housing 1, a tubular insertion part 2 with a circumferential retaining rib 3, and of an indicator part 4 or 20 that can be connected to the plug housing 1.

In its insertion area, the cylindrical plug housing 1 has an, accommodation area 5 for a separate retaining element 6, which is inserted from the outside across the housing axis and is equipped with radially inward-directed catch edges 7, which are intended to reach behind the retaining rib 3 after the pressing of the insertion part 2 into the plug housing 1 and to hold it in closed position (cf. EP 0 605 801 B1).

In order to prove correct assembly, an indicator part 4 is additionally provided between insertion part 2 and plug housing 1 and consists of two support rings 8, 9 or 22, 21 arranged some distance apart and two elastic ridges 10 joining the two support rings, which are formed so as to be able to spring up elastically on the opposing end faces of the support rings and are connected together by outwards-curved bridging strips 11.

In the embodiment according to FIGS. 1–5, the support ring 8 shown at the right in the drawing is located in front of the opening 15 of the plug housing 1 and can be joined to the latter in a manner yet to be described for preassembly. The other support ring 9 rests against the insertion part 2 on a flange 12 behind the retaining rib 3 when the insertion part 2 is pressed in the direction of the arrow "E" through the two annular drilled holes 13 and 14 of the support rings 8 and 9 into the opening 15 of the plug housing 1. In the process, as is evident from FIG. 5, the elastic ridges 10 are folded together and the bridging strips 11 are curved outwards so that these bridging strips 11 project visibly outside the outer wall 16 of the plug housing 1.

In order to hold the indicator part 4 secure in the envisioned connection to the plug housing 1 for impending usage, two axially running retaining ridges 17 can be introduced in assembly in the direction of the arrow "M" into corresponding retaining pockets 18 on the outer wall 16 of the plug housing 1 and engaged by means of radially outwards-projecting catch tabs 19 in these retaining pockets 18, and are formed onto the outer rim of the support ring 8.

In addition to this preferred manner of anchoring the retaining ridges 17 in the retaining pockets 18, other types of connection which are suited to hold the indicator part 4 ready for use in front of the opening 15 of the plug housing 1 are naturally also conceivable.

In order to achieve a better flexibility when pressing the support rings 8 and 9 together, the outwards-curved bridging strips 11 are formed narrower with the same material thickness as the elastic ridges 10 formed on the support rings 8 and 9.

In addition to indicating assembly, the indicator part 4 offers the further advantage that the insertion part 2, when not completely inserted into the plug housing 1 and thus also not engaged behind the elastic retainer 6, is pressed out of the plug housing 1 in a clearly visible manner, due to the restoring forces of the elastic ridges 10 and bridging strips 11. Thus the assembler receives an unambiguous indication that he must still press the insertion part 2 firmly in.

Another embodiment of the indicator part is illustrated in FIGS. 6–8, which is premounted on the insertion part 2 (FIG. 9) and pressed together with the latter into the insertion opening 15.

This indicator part 20 likewise consists of two support rings 21 and 22 which, exactly like the aforementioned indicator part 4, are connected via the same elastic ridges 10 and bridging strips 11.

The support ring 21 resting against the flange 12 of the insertion part 2 possesses two support ridges 23 formed on its inside rim so as to spring up and pointing in the direction of the other support ring 22, which [support ridges] first bend apart when the indicator part 20 is pressed onto the insertion part 2 and, after passing over the retaining rib 3, spring back together again and also engage with the catch edges 24 behind the retaining rib 3. For this purpose, the support ridges 23 have a length L which corresponds exactly to the spacing (a) between flange 12 and retaining rib 3. In order to guarantee good contact on the tubular jacket 25 of the insertion part 2, it is also provided that the inside diameter in the area of the support edge 24 is somewhat smaller than the outer diameter R of the insertion part 2.

For secure engagement of the insertion part 2, it is also provided that the outer diameter D of the support ridges 23 in the area in front of the support edge 24 is smaller than the outer diameter H of the retaining ridge 3, so that sufficient contact surface remains for reaching behind the catch edges 7 of the retaining element 6 behind the retaining rib 3.

Since the inner rim of the support ring 21 must be somewhat larger in diameter than the outer diameter H of the retaining rib 3, the support ridges 23 are formed such that they first taper conically inwards from the inner rim of the support ring 21 and continue on parallel to the tubular jacket 25 after roughly half the length L of the support ridges 23.

Also for optimal contact of the support ridges 23 on the tubular jacket 25, the area in front of the support edge 24 is formed such that the inner wall of the support ridge 23 again runs conically somewhat inwards.

The support ring 22 expediently has a centering sleeve 26 pointing towards the plug housing 1 which fits exactly into the insertion opening 15 upon introduction of the insertion part 2 into the plug housing 1.

What is claimed is:

1. An indicator device for use with a detachable plug assembly having a tubular insert member and a plug housing, the tubular member having a circumferential ring disposed between an end and an annular flange, the plug housing having a retaining element having at least one edge portion for engaging said insert member when said tubular member is inserted into a cavity of said plug;

said indicator device comprising a pair of elongated connecting portions extending in an axial direction between a pair of rings, each of said connecting portions having a bridging strip which folds together in an arc to project in a direction radially outwardly from said rings when said at least one edge portion of said retaining member engages said ring of said tubular member in said locked position, said pair of rings positioned between said flange of said insert member and said plug housing.

2. The indicator device of claim 1, wherein each said connection portions comprise an outwardly curved bridging portion extending between a pair of resilient web portions.

3. The indicator device of claim 2, wherein said bridge straps have a predetermined width and flexibility which is less than a width and flexibility of said webs.

4. The indicator device of claim 1, further comprising a pair of retaining projections extending in an axial direction and having catch tabs for engaging retaining pockets formed on said plug housing.

5. The indicator device of claim 1, further comprising at least two support arms extending from one of said rings toward an other of said rings, said arm having a predetermined length equal to the distance between said flange and said retaining ring of said insert member.

6. The indicator device of claim 5, wherein said support anus have edges having a predetermined diameter which is smaller than an outside diameter of said retaining ring.

7. The indicator device of claim 5, wherein said support arms further comprise an inner portion which tapers inwardly from said one ring, said inner portion extending generally one-half of said predetermined length, and an outer portion extending in an axial direction.

8. The indicator device of claim 5, wherein said arms have a conical portion adjacent said edges.

\* \* \* \* \*

UNITED STATES PATENT AND TRADEMARK OFFICE
CERTIFICATE OF CORRECTION

PATENT NO.    : 6,089,616
DATED         : July 18, 2000
INVENTOR(S)   : Michael Trede et al.

It is certified that error appears in the above-identified patent and that said Letters Patent is hereby corrected as shown below:

Delete Title page and substitute therefore the attached title page as shown on the attached page.

Delete columns 1-6 and substitute therefore columns 1-6 as shown on the attached pages.

Signed and Sealed this

Sixth Day of May, 2003

JAMES E. ROGAN
*Director of the United States Patent and Trademark Office*

United States Patent [19]
Trede et al.

[11] Patent Number: 6,089,616
[45] Date of Patent: Jul. 18, 2000

[54] RELEASABLE PLUG CONNECTOR WITH FITTING INDICATOR

[75] Inventors: Michael Trede, Rixheim; Jean-Martin Henlin, Waldighoffen, both of France

[73] Assignee: A. Raymond & Cie, France

[21] Appl. No.: 09/202,754

[22] PCT Filed: May 28, 1997

[86] PCT No.: PCT/EP97/02751

§ 371 Date: Dec. 16, 1998

§ 102(e) Date: Dec. 16, 1998

[87] PCT Pub. No.: WO97/48936

PCT Pub. Date: Dec. 24, 1997

[30] Foreign Application Priority Data

Jun. 20, 1996 [DE] Germany ............... 196 24 524

[51] Int. Cl.$^7$ ................................. F16L 35/00
[52] U.S. Cl. ................ 285/93; 285/308; 285/321
[58] Field of Search ................. 285/93, 308, 321

[56] References Cited

U.S. PATENT DOCUMENTS

| | | | |
|---|---|---|---|
| 4,925,217 | 5/1990 | Ketcham | 285/93 |
| 5,112,085 | 5/1992 | Busch et al. | 285/308 X |
| 5,378,024 | 1/1995 | Kumagai et al. | 285/321 X |
| 5,441,313 | 8/1995 | Kalahasthy | 285/93 |
| 5,779,278 | 7/1998 | Grooters et al. | 285/93 |

FOREIGN PATENT DOCUMENTS 547489  6/1993  European Pat. Off. ............... 285/93

*Primary Examiner*—Lynne H. Browne
*Assistant Examiner*—David E. Bochna
*Attorney, Agent, or Firm*—Gifford, Krass, Groh, Sprinkle, Anderson & Citkowski, P.C.

[57] ABSTRACT

A indicator device for use with a detachable plug assembly includes a pair of spaced apart rings joined together by a pair of elongated connecting portions. The connecting portions extend in an axial direction between the rings. The connecting portions each have a outwardly curved bridging strip portion extending between a pair of flexible webs. The rings are mounted between the plug housing and the flange on the tubular insert member so that the bridging strips bulge outwardly to form a loop when the insert member is fully inserted into the plug to indicate that the insert member is properly locked within the plug. The indicator device may be connected either to the plug housing or the insert member prior to assembly.

8 Claims, 2 Drawing Sheets

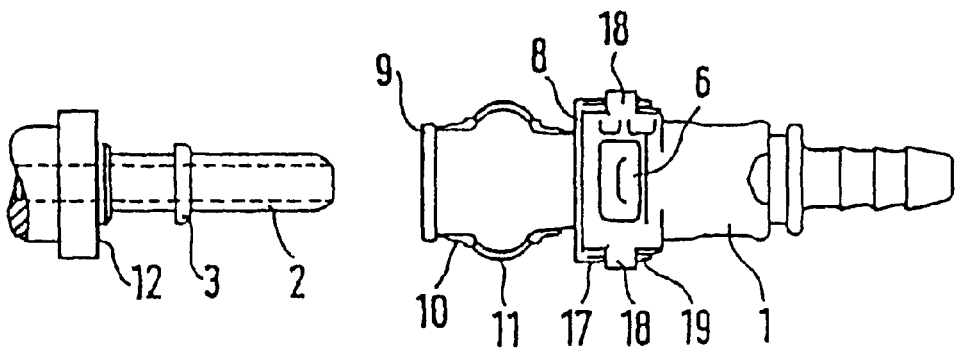

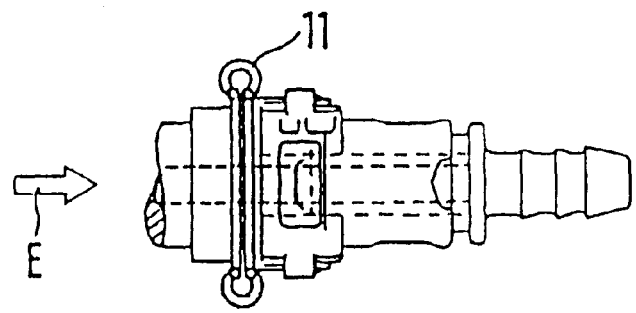

RELEASABLE PLUG CONNECTOR WITH FITTING INDICATOR

BACKGROUND OF THE INVENTION

I Field of the Invention:

The invention [pertains] relates to an assembly indicator for a detachable plug connection [with] assembly [indicator] for connecting fluid lines [corresponding to the preamble of Claim 1].

II Description of the Prior Art:

When [bringing] connection together the insertion part and the plug housing it is particularly important that the retaining rib [engages] locks securely with the retaining element of the plug, so that the connection [point] assembly is held absolutely secure. The engagement of the retaining rib on the [spring-opening] catch edges of the retaining element causes a click sound which confirms the [production of the] connection to the assembler, but this sound cannot be reliably perceived, depending on the noise level on the job, so that [an] there is no absolute guarantee of the engagement of the insertion part [is not assured].

In order to be certain of the engagement of the retaining rib during assembly, [it is possible for] the assembler [to] can pull on the assembled plug connection assembly to see whether it holds. There is no guarantee, however, that the assembler has actually performed this retention test, since it cannot be seen from viewing the plug connection whether this check has actually been performed. There is thus nothing left for postmonitoring other than to pull once again on the plug connection assembly.

In order to improve this monitoring, an indicator [part] device consisting of two spaced apart support rings [spaced apart] and two [ridges] connecting webs extending between the support rings [together, which can be] have been positioned in front of the insertion opening of the housing, [is provided in prior art according to] as disclosed in EP 0 547 489 A1. While [the] one support ring contacts the front housing wall or its front end, the second support ring projects into the housing interior and is held by the connecting [ridges] webs in a waiting position directly behind the catch edges of the retaining element[, specifically, at]. At such a spacing, [that] the retaining [rib] ring of the insertion part presses against the supporting ring of the insertion part shortly before engagement [on] with the catch edges.

The connecting [ridges] webs are connected [here] to the support ring, with the so-called indicator section[.] contacting the front of the housing entry by way of separable weakened areas [which]. These areas separate upon further penetration of the insertion part into the housing interior, at the latest upon engagement of the catch edges behind the retaining [rib] ring. The detachment of the indicator section is to serve as the indicator of a proper coupling between the insertion part and the plug housing, with a bracket part projecting radially away from the indicator part [being provided, with which the]. The indicator part can be grabbed and removed from the connecting [ridges] webs after detachment.

The absence of the bracket with associated indicator part is thus certain proof that the plug connection has been closed; otherwise the assembler would not have been able to remove the bracket. But this type of monitoring also involves an additional expenditure of labor, so that [at bottom] nothing is gained by the expensive indicator part [over and against] compared to pulling on the assembled insertion part.

SUMMARY OF THE INVENTION

The problem of the invention is to design or supplement the aforementioned plug connection such that a visually well-recognizable proof of the secure connection is obtained without additional manual measures.

This problem is solved [according to the characterizing features of Claim 1 in that the other support ring turned away from the housing wall can be supported on the insertion part on a flange behind the retaining rib, and the ridges] by providing an indicator device having a pair of [on both] rings [are formed to spring open elastically and are mutually] connected by resilient webs are outwardly curved bridging strips [curved outwards] which fold together in an arc to the outside when the insertion [part] member is pressed in [and]. The folded strips project visibly beyond the housing wall.

The elastic spring [ridges here] webs offer the additional advantage that, in case of incomplete assembly, the plug housing is pressed away from the insertion [part] member due to the [restoring] biasing forces in the [ridges, so that the] webs. The assembler is immediately informed and can press the plug housing firmly back on again.

In order to ease the positioning of the indicator part between the insertion [part] member and the plug housing, two possibilities are provided for preassembly.

In the preferred embodiment [according to Claim 2], two retaining [ridges running axially] projections are formed on the outside of [the] a supporting ring [that can] to be connected to the housing wall[, the]. The front housing wall [having] has corresponding retaining brackets [in the introduction area,] into which the retaining [ridges] projections can be introduced and engaged by means of [catch tabs] radially projecting [radially outward] catch tabs. In this way the indicator [part] device can be connected without problems at the manufacturer's facility and the customer can immediately join the preassembled unit to the insertion part.

In the [other] alternative preferred embodiment, [according to Claim 3.] the support ring [resting] rests on the flange of the insertion [part] member [possesses] and has at least two elastically expanding support, [ridges] arms pointing in the direction of the other support ring [, the]. The length of [which] the arms [ridges] corresponds to the spacing between the flange and the retaining rib[, and] of the insertion member. Additionally, an inside diameter [which in the areas in front] of the front support edge is somewhat smaller than the tube diameter of the insertion [part] member. Thereby, the indicator [part] device can be conveniently premounted on the insertion [part] member and then [put together] assembled with the plug housing at the customer's facility. An additional advantage of this embodiment [consists in the fact] is that the overall length of the insertion [part] member is not changed, because the indicator [part] device is shorter than the total length of the tubular part.

[The feature cited in Claims 4–6 relate to a practical embodiment and dimensioning of the support ridges mentioned in claim 3, so that these] The support arms are dimensioned to lie tightly against the tubular part in front of the retaining [rib] ring after [pushing] the indicator [part] device is pushed onto the insertion [part (Claims 4 and 6) and] member so that the retaining [element] member of the plug housing has sufficient space to [reach] extend behind the retaining [rib (Claim 5)] ring. Finally, [it is provided according to Claim 7 that] the outwards-curved bridging strips are narrower and thus more flexible than the elastic [ridges formed on the support ridge] webs. This has the effect that the curved bridging strips close together into a circle upon folding up, without great expenditure of force.

DESCRIPTION OF THE DRAWINGS

[Two] The preferred embodiments of the invention are presented in the drawings and are to be described in greater detail below. Shown are:

[FIG. 1, the main elements] FIG. 1 is an exploded view of the plug connection assembly with an indicator [part] device premounted on the plug housing before assembly;

[Figure] FIG. 2[,] is a side view of the plug housing with [mounted] the indicator [part in a side view] device;

[FIG. 3,] FIG. 3 is a plan view of the plug housing with indicator [part] device [in a plan view from the right];

[FIG. 4,] FIG. 4 is a side view rotated 90° from FIG. 3 of the plug housing with mounted indicator [part] device [in a side view rotated by 90°] with the associated insertion [part] member before being pressed in;

[FIG. 5,] FIG. 5 is a side view of the [same] plug housing coupled with [pressed-in] an insertion part and folded-together indicator part;

[FIG. 6,] FIG. 6 is a side view of and alternative preferred embodiment [another form] of the indicator [part] device, which can be premounted on the insertion [part] member [, in a side view];

[FIG. 7,] FIG. 7 [the same indicator part in] is a plan view of the alternative preferred embodiment of the indicator device in the direction of arrow A;

[FIG. 8,] FIG. 8 is a longitudinal section [through the indicator part] taken from along line VIII—VIII in [FIG. 6] FIG. 6 of an alternative preferred embodiment of the indicator device;

[FIG. 9, the insertion part with indicator part] FIG. 9 is a side view of an alternative preferred embodiment of the indicator device before being pressed onto the insertion member;

[FIG. 10, the insertion part] FIG. 10 is a side view of the alternative preferred embodiment of the indicator device with the premounted indicator [part] device before being pressed into the plug housing; and

[FIG. 11, the same assembly diagram] FIG. 11 is a side view of the alternative preferred embodiment of the indicator device with [pressed-in] the insertion [part] member and folded-together indicator part in the coupled position.

DETAILED DESCRIPTION OF THE PREFERRED EMBODIMENT

The plug connection assembly 30 represented in the figures [serves for the] provides for a detachable connection of fluid lines, in particular automobile fuel lines [in automobile manufacturing]. [It] The assembly 30 consists in general of a cylindrical plug housing 1, a tubular insertion [part] member 2 with a circumferential retaining [rib] ring 3, and [of] an indicator [part] device 4 [or 20] that can be connected to the plug housing 1.

In [its] the insertion [area] cavity, the cylindrical plug housing 1 has an accommodation [area] space 5 for a separate retaining [element]member 6[, which]. the retaining member is inserted from the outside across the housing axis and [is equipped with] has radially [inward-directed] inwardly directed catch edges 7[, which]. The catch edges are intended to [reach behind] extend on an upstream side of the retaining [rib] ring 3 after [the pressing] insertion of the insertion [part] member 2 into the plug housing 1 and to [hold it] lock the assembly in a closed position (cf. EP 0 605 801 B1).

In order to prove correct assembly, [an] the indicator [part] device 4 is [additionally] provided between insertion [part] member 2 and plug housing 1 [and]. The indicator device 4 consists of two support rings 8, 9 or 22, 21 arranged some distance apart [and] by a pair of connecting portions. Each connecting portion includes two webs 10 and a bridging strip 11. The two elastic [ridges] webs 10 [joining] extend from the two support rings, [which] and are formed so as to be able to spring up elastically on the opposing end faces of the support rings [and]. The webs 10 are connected together by [outwards-curved] outwardly curved bridging strips 11.

In the preferred embodiment according to FIGS. 1–5, the support ring 8 shown at the right in the drawing is located in front of [the] an access opening 15 of the plug housing 1 and can be joined to the latter in a manner [yet to be] described below for preassembly. The other support ring 9 rests against the insertion [part] member 2 on a flange 12 behind the retaining [rib] ring 3 when the insertion [part] member 2 is pressed in the direction of the arrow "E" through the two annular [drilled] holes 13 and 14 [of] formed in the support rings 8 and 9 into the opening 15 of the plug housing 1. In the process, as is [evident from Figure] shown in FIG. 5, the elastic [ridges] webs 10 are folded together and the bridging strips 11 are curved [outwards] so that these bridging strips 11 project visibly outside the outer wall 16 of the plug housing 1.

In order to hold the indicator [part] member 4 secure [in the envisioned connection] to the plug housing 1 for impending usage, two axially [running] extending retaining [ridges] projections 17 can be introduced [in assembly] in the direction of the arrow "M" into corresponding retaining pockets 18 on the outer wall 16 of the plug housing 1 [and engaged]. The projections 17 engage the pockets 18 by means of radially [outwards-projecting] outwardly projecting catch tabs 19 [in these retaining pockets 18, and are formed onto]. The projections 17 extend from the outer rim of the support ring 8.

In addition to this [preferred] manner of anchoring the retaining [ridges] projections 17 in the retaining pockets 18, other types of connection which [are suited to] hold the indicator part 4 ready for use in front of the opening 15 of the plug housing 1 are [naturally] also conceivable.

In order to achieve a better flexibility when pressing the support rings 8 and 9 together, the [outwards-curved] outwardly curved bridging strips 11 are formed narrower but with the same material thickness as the elastic [ridges] webs 10 formed on the support rings 8 and 9.

In addition to indicating assembly, the indicator [part] device 4 offers the further advantage that the insertion [part] member 2, when not completely inserted into the plug housing 1 and thus also not engaged behind the elastic retainer member 6, is pressed out of the plug housing 1 in a clearly visible manner, due to the [restoring] biasing forces of the elastic [ridges] webs 10 and bridging strips 11. Thus the assembler receives an unambiguous indication that he must still press the insertion [part] member 2 firmly in.

[Another] An alternative preferred embodiment of the indicator [part] device 20 is illustrated in [Figures] FIGS. 6–8[, which]. The indicator device is premounted on the insertion [part] member 2 ([Figure] FIG. 9) and pressed together with the latter into the insertion opening 15 of the plug housing.

[This] The indicator [part] device 20 likewise consists of two support rings 21 and 22 which, exactly like the aforementioned indicator [part]device 4, are connected via the same [elastic ridges] connection portion having webs 10 and bridging strips 11.

The support ring 21 [resting] rests against the flange 12 of the insertion [part] member 2 [possesses] and has two support [ridges] resilient arms 23 formed on its inside rim so as to [spring up and pointing] point in the direction of the other support ring 22[, which support ridges]. The support arms 23 first bend apart when the indicator [part] device 20 is pressed onto the insertion [part] member 2 and, after passing over the retaining [rib] ring 3, spring back together again [and]. The arms 23 also engage [with] the catch edges 24 behind and upstream of the retaining [rib] ring 3. [For this purpose, the] The support [ridges] arms 23 have a length L which corresponds exactly to the spacing (a) between flange 12 and retaining [rib] ring 3. In order to guarantee good contact on the tubular [jacket] surface 25 of the insertion [part] member 2, it is also provided that the inside diameter of the arms in the area of the support edge 24 is somewhat smaller than the outer diameter R of the insertion [part] member 2.

For secure engagement of the insertion [part] member 2, it is also provided that the outer diameter D of the support [ridges] arms 23 in the area in front of the support edge 24 is smaller than the outer diameter H of the retaining [ridge] ring 3, so that sufficient contact surface remains for reaching being the catch edges 7 of the retaining [element] member 6 behind the retaining [rib] ring 3.

Since the inner rim of the support ring 21 must be somewhat larger in diameter than the outer diameter H of the retaining rib 3, the support, [ridges] arms 23 are formed such that they first taper conically inwards from the inner rim of the support ring 21 and continue on parallel to the tubular [jacket] surface 25 after roughly half the length L of the support ridges 23.

Also for optimal contact of the support [ridges] arms 23 on the tubular [jacket] surface 25, the area in front of the support edge 24 is formed such that the inner wall of the support [ridge] arms 23 [against runs conically] extends inwardly somewhat conically [inwards].

[The] Advantageously, the support ring 22 [expediently] has a centering sleeve 26 [pointing] extending towards the plug housing 1 which fits exactly into the insertion opening 15 upon introduction of the insertion [part] member 2 into the plug housing 1.

What is claimed is:

1. An indicator device for use with a detachable plug assembly having a tubular insert member and a plug housing, the tubular member having a circumferential ring disposed between an end and an annular flange, the plug housing having a retaining element having at least one edge portion for engaging said insert member when said tubular member is inserted into a cavity of said plug;

said indicator device comprising a pair of elongated connecting portions extending in an axial direction between a pair of rings, each of said connecting portions having a bridging strip which folds together in an arc to project in a direction radially outwardly from said rings when said at least one edge portion of said retaining member engages said ring of said tubular member in said locked position, said pair of rings positioned between said flange of said insert member and said plug housing.

2. The indicator device of claim 1, wherein each said connection portions comprise an outwardly curved bridging portion extending between a pair of resilient web portions.

3. The indicator device of claim 2, wherein said bridge straps have a predetermined width and flexibility which is less than a width and flexibility of said webs.

4. The indicator device of claim 1, further comprising a pair of retaining projections extending in an axial direction and having catch tabs for engaging retaining pockets formed on said plug housing.

5. The indicator device of claim 1, further comprising at least two support arms extending from one of said rings toward an other of said rings, said arm having a predetermined length equal to the distance between said flange and said retaining ring of said insert member.

6. The indicator device of claim 5, wherein said support arms have edges having a predetermined diameter which is smaller than an outside diameter of said retaining ring.

7. The indicator device of claim 5, wherein said support arms further comprise an inner portion which tapers inwardly from said one ring, said inner portion extending generally one-half of said predetermined length, and an outer portion extending in an axial direction.

8. The indicator device of claim 5, wherein said arms have a conical portion adjacent said edges.

* * * * *

UNITED STATES PATENT AND TRADEMARK OFFICE
CERTIFICATE OF CORRECTION

PATENT NO.   : 6,089,616
DATED        : July 18, 2000
INVENTOR(S)  : Michael Trede et al.

It is certified that error appears in the above-identified patent and that said Letters Patent is hereby corrected as shown below:

Delete Title page and substitute therefore the attached title page as shown on the attached page.

Delete columns 1-6 and substitute therefore columns 1-6 as shown on the attached pages.

<u>Title page,</u>
Item [57], ABSTRACT
Line 1, at the beginning of the sentence, delete "A" and insert -- An --

Signed and Sealed this

Thirtieth Day of September, 2003

JAMES E. ROGAN
*Director of the United States Patent and Trademark Office*

United States Patent [19]
Trede et al.

[11] Patent Number: 6,089,616
[45] Date of Patent: Jul. 18, 2000

[54] RELEASABLE PLUG CONNECTOR WITH FITTING INDICATOR

[75] Inventors: Michael Trede, Rixheim; Jean-Martin Henlin, Waldighoffen, both of France

[73] Assignee: A. Raymond & Cie, France

[21] Appl. No.: 09/202,754

[22] PCT Filed: May 28, 1997

[86] PCT No.: PCT/EP97/02751

§ 371 Date: Dec. 16, 1998

§ 102(e) Date: Dec. 16, 1998

[87] PCT Pub. No.: WO97/48936

PCT Pub. Date: Dec. 24, 1997

[30] Foreign Application Priority Data

Jun. 20, 1996 [DE] Germany .................. 196 24 524

[51] Int. Cl.[7] ................................. F16L 35/00
[52] U.S. Cl. ..................... 285/93; 285/308; 285/321
[58] Field of Search ...................... 285/93, 308, 321

[56] References Cited

U.S. PATENT DOCUMENTS

| | | | |
|---|---|---|---|
| 4,925,217 | 5/1990 | Ketcham | 285/93 |
| 5,112,085 | 5/1992 | Busch et al. | 285/308 X |
| 5,378,024 | 1/1995 | Kumagai et al. | 285/321 X |
| 5,441,313 | 8/1995 | Kalahasthy | 285/93 |
| 5,779,278 | 7/1998 | Grooters et al. | 285/93 |

FOREIGN PATENT DOCUMENTS 547489  6/1993  European Pat. Off. ............... 285/93

*Primary Examiner*—Lynne H. Browne
*Assistant Examiner*—David E. Bochna
*Attorney, Agent, or Firm*—Gifford, Krass, Groh, Sprinkle, Anderson & Citkowski, P.C.

[57] ABSTRACT

A indicator device for use with a detachable plug assembly includes a pair of spaced apart rings joined together by a pair of elongated connecting portions. The connecting portions extend in an axial direction between the rings. The connecting portions each have a outwardly curved bridging strip portion extending between a pair of flexible webs. The rings are mounted between the plug housing and the flange on the tubular insert member so that the bridging strips bulge outwardly to form a loop when the insert member is fully inserted into the plug to indicate that the insert member is properly locked within the plug. The indicator device may be connected either to the plug housing or the insert member prior to assembly.

8 Claims, 2 Drawing Sheets

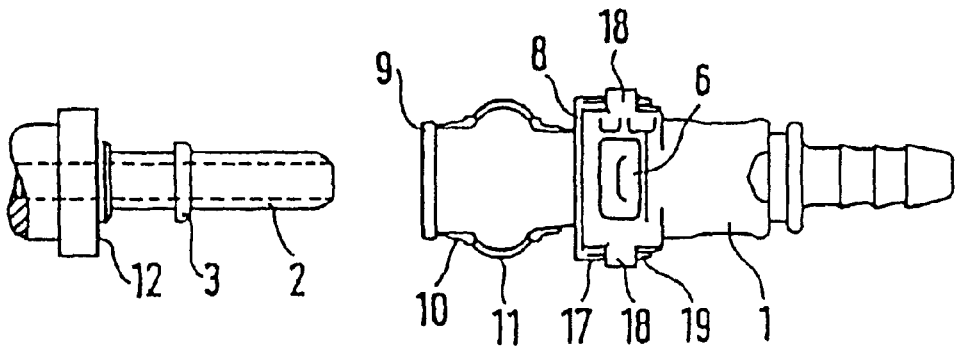

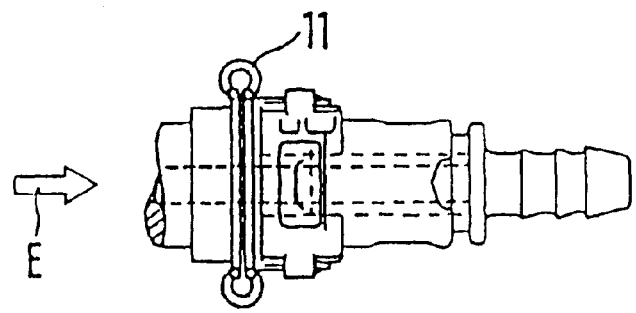

RELEASABLE PLUG CONNECTOR WITH FITTING INDICATOR

BACKGROUND OF THE INVENTION

I Field of the Invention:

The invention [pertains] relates to an assembly indicator for a detachable plug connection [with] assembly [indicator] for connecting fluid lines [corresponding to the preamble of Claim 1].

II Description of the Prior Art:

When [bringing] connection together the insertion part and the plug housing it is particularly important that the retaining rib [engages] locks securely with the retaining element of the plug, so that the connection [point] assembly is held absolutely secure. The engagement of the retaining rib on the [spring-opening] catch edges of the retaining element causes a click sound which confirms the [production of the] connection to the assembler, but this sound cannot be reliably perceived, depending on the noise level on the job, so that [an] there is no absolute guarantee of the engagement of the insertion part [is not assured].

In order to be certain of the engagement of the retaining rib during assembly, [it is possible for] the assembler [to] can pull on the assembled plug connection assembly to see whether it holds. There is no guarantee, however, that the assembler has actually performed this retention test, since it cannot be seen from viewing the plug connection whether this check has actually been performed. There is thus nothing left for postmonitoring other than to pull once again on the plug connection assembly.

In order to improve this monitoring, an indicator [part] device consisting of two spaced apart support rings [spaced apart] and two [ridges] connecting webs extending between the support rings [together, which can be] have been positioned in front of the insertion opening of the housing, [is provided in prior art according to] as disclosed in EP 0 547 489 A1. While [the] one support ring contacts the front housing wall or its front end, the second support ring projects into the housing interior and is held by the connecting [ridges] webs in a waiting position directly behind the catch edges of the retaining element[, specifically, at]. At such a spacing, [that] the retaining [rib] ring of the insertion part presses against the supporting ring of the insertion part shortly before engagement [on] with the catch edges.

The connecting [ridges] webs are connected [here] to the support ring, with the so-called indicator section[,] contacting the front of the housing entry by way of separable weakened areas [which]. These areas separate upon further penetration of the insertion part into the housing interior, at the latest upon engagement of the catch edges behind the retaining [rib] ring. The detachment of the indicator section is to serve as the indicator of a proper coupling between the insertion part and the plug housing, with a bracket part projecting radially away from the indicator part [being provided, with which the]. The indicator part can be grabbed and removed from the connecting [ridges] webs after detachment.

The absence of the bracket with associated indicator part is thus certain proof that the plug connection has been closed; otherwise the assembler would not have been able to remove the bracket. But this type of monitoring also involves an additional expenditure of labor, so that [at bottom] nothing is gained by the expensive indicator part [over and against] compared to pulling on the assembled insertion part.

SUMMARY OF THE INVENTION

The problem of the invention is to design or supplement the aforementioned plug connection such that a visually well-recognizable proof of the secure connection is obtained without additional manual measures.

This problem is solved [according to the characterizing features of Claim 1 in that the other support ring turned away from the housing wall can be supported on the insertion part on a flange behind the retaining rib, and the ridges] by providing an indicator device having a pair of [on both] rings [are formed to spring open elastically and are mutually] connected by resilient webs are outwardly curved bridging strips [curved outwards] which fold together in an arc to the outside when the insertion [part] member is pressed in [and]. The folded strips project visibly beyond the housing wall.

The elastic spring [ridges here] webs offer the additional advantage that, in case of incomplete assembly, the plug housing is pressed away from the insertion [part] member due to the [restoring] biasing forces in the [ridges, so that the] webs. The assembler is immediately informed and can press the plug housing firmly back on again.

In order to ease the positioning of the indicator part between the insertion [part] member and the plug housing, two possibilities are provided for preassembly.

In the preferred embodiment [according to Claim 2], two retaining [ridges running axially] projections are formed on the outside of [the] a supporting ring [that can] to be connected to the housing wall[, the]. The front housing wall [having] has corresponding retaining brackets [in the introduction area,] into which the retaining [ridges] projections can be introduced and engaged by means of [catch tabs] radially projecting [radially outward] catch tabs. In this way the indicator [part] device can be connected without problems at the manufacturer's facility and the customer can immediately join the preassembled unit to the insertion part.

In the [other] alternative preferred embodiment, [according to Claim 3,] the support ring [resting] rests on the flange of the insertion [part] member [possesses] and has at least two elastically expanding support, [ridges] arms pointing in the direction of the other support ring [, the]. The length of [which] the arms [ridges] corresponds to the spacing between the flange and the retaining rib[, and] of the insertion member. Additionally, an inside diameter [which in the areas in front] of the front support edge is somewhat smaller than the tube diameter of the insertion [part] member. Thereby, the indicator [part] device can be conveniently premounted on the insertion [part] member and then [put together] assembled with the plug housing at the customer's facility. An additional advantage of this embodiment [consists in the fact] is that the overall length of the insertion [part] member is not changed, because the indicator [part] device is shorter than the total length of the tubular part.

[The feature cited in Claims 4–6 relate to a practical embodiment and dimensioning of the support ridges mentioned in claim 3, so that these] The support arms are dimensioned to lie tightly against the tubular part in front of the retaining [rib] ring after [pushing] the indicator [part] device is pushed onto the insertion [part (Claims 4 and 6) and] member so that the retaining [element] member of the plug housing has sufficient space to [reach] extend behind the retaining [rib (Claim 5)] ring. Finally, [it is provided according to Claim 7 that] the outwards-curved bridging strips are narrower and thus more flexible than the elastic [ridges formed on the support ridge] webs. This has the effect that the curved bridging strips close together into a circle upon folding up, without great expenditure of force.

DESCRIPTION OF THE DRAWINGS

[Two] The preferred embodiments of the invention are presented in the drawings and are to be described in greater detail below. Shown are:

[FIG. 1, the main elements] FIG. 1 is an exploded view of the plug connection assembly with an indicator [part] device premounted on the plug housing before assembly;

[Figure] FIG. 2[,] is a side view of the plug housing with [mounted] the indicator [part in a side view] device;

[FIG. 3,] FIG. 3 is a plan view of the plug housing with indicator [part] device [in a plan view from the right];

[FIG. 4,] FIG. 4 is a side view rotated 90° from FIG. 3 of the plug housing with mounted indicator [part] device [in a side view rotated by 90°] with the associated insertion [part] member before being pressed in;

[FIG. 5,] FIG. 5 is a side view of the [same] plug housing coupled with [pressed-in] an insertion part and folded-together indicator part;

[FIG. 6,] FIG. 6 is a side view of and alternative preferred embodiment [another form] of the indicator [part] device, which can be premounted on the insertion [part] member [, in a side view];

[FIG. 7,] FIG. 7 [the same indicator part in] is a plan view of the alternative preferred embodiment of the indicator device in the direction of arrow A;

[FIG. 8,] FIG. 8 is a longitudinal section [through the indicator part] taken from along line VIII—VIII in [FIG. 6] FIG. 6 of an alternative preferred embodiment of the indicator device;

[FIG. 9, the insertion part with indicator part] FIG. 9 is a side view of an alternative preferred embodiment of the indicator device before being pressed onto the insertion member;

[FIG. 10, the insertion part] FIG. 10 is a side view of the alternative preferred embodiment of the indicator device with the premounted indicator [part] device before being pressed into the plug housing; and

[FIG. 11, the same assembly diagram] FIG. 11 is a side view of the alternative preferred embodiment of the indicator device with [pressed-in] the insertion [part] member and folded-together indicator part in the coupled position.

DETAILED DESCRIPTION OF THE PREFERRED EMBODIMENT

The plug connection assembly 30 represented in the figures [serves for the] provides for a detachable connection of fluid lines, in particular automobile fuel lines [in automobile manufacturing]. [It] The assembly 30 consists of in general of a cylindrical plug housing 1, a tubular insertion [part] member 2 with a circumferential retaining [rib] ring 3, and [of] an indicator [part] device 4 [or 20] that can be connected to the plug housing 1.

In [its] the insertion [area] cavity, the cylindrical plug housing 1 has an accommodation [area] space 5 for a separate retaining [element]member 6[, which]. the retaining member is inserted from the outside across the housing axis and [is equipped with] has radially [inward-directed] inwardly directed catch edges 7[, which]. The catch edges are intended to [reach behind] extend on an upstream side of the retaining [rib] ring 3 after [the pressing] insertion of the insertion [part] member 2 into the plug housing 1 and to [hold it] lock the assembly in a closed position (cf. EP 0 605 801 B1).

In order to prove correct assembly, [an] the indicator [part] device 4 is [additionally] provided between insertion [part] member 2 and plug housing 1 [and]. The indicator device 4 consists of two support rings 8, 9 or 22, 21 arranged some distance apart [and] by a pair of connecting portions. Each connecting portion includes two webs 10 and a bridging strip 11. The two elastic [ridges] webs 10 [joining] extend from the two support rings, [which] and are formed so as to be able to spring up elastically on the opposing end faces of the support rings [and]. The webs 10 are connected together by [outwards-curved] outwardly curved bridging strips 11.

In the preferred embodiment according to FIGS. 1–5, the support ring 8 shown at the right in the drawing is located in front of [the] an access opening 15 of the plug housing 1 and can be joined to the latter in a manner [yet to be] described below for preassembly. The other support ring 9 rests against the insertion [part] member 2 on a flange 12 behind the retaining [rib] ring 3 when the insertion [part] member 2 is pressed in the direction of the arrow "E" through the two annular [drilled] holes 13 and 14 [of] formed in the support rings 8 and 9 into the opening 15 of the plug housing 1. In the process, as is [evident from Figure] shown in FIG. 5, the elastic [ridges] webs 10 are folded together and the bridging strips 11 are curved [outwards] so that these bridging strips 11 project visibly outside the outer wall 16 of the plug housing 1.

In order to hold the indicator [part] member 4 secure [in the envisioned connection] to the plug housing 1 for impending usage, two axially [running] extending retaining [ridges] projections 17 can be introduced [in assembly] in the direction of the arrow "M" into corresponding retaining pockets 18 on the outer wall 16 of the plug housing 1 [and engaged]. The projections 17 engage the pockets 18 by means of radially [outwards-projecting] outwardly projecting catch tabs 19 [in these retaining pockets 18, and are formed onto]. The projections 17 extend from the outer rim of the support ring 8.

In addition to this [preferred] manner of anchoring the retaining [ridges] projections 17 in the retaining pockets 18, other types of connection which [are suited to] hold the indicator part 4 ready for use in front of the opening 15 of the plug housing 1 are [naturally] also conceivable.

In order to achieve a better flexibility when pressing the support rings 8 and 9 together, the [outwards-curved] outwardly curved bridging strips 11 are formed narrower but with the same material thickness as the elastic [ridges] webs 10 formed on the support rings 8 and 9.

In addition to indicating assembly, the indicator [part] device 4 offers the further advantage that the insertion [part] member 2, when not completely inserted into the plug housing 1 and thus also not engaged behind the elastic retainer member 6, is pressed out of the plug housing 1 in a clearly visible manner, due to the [restoring] biasing forces of the elastic [ridges] webs 10 and bridging strips 11. Thus the assembler receives an unambiguous indication that he must still press the insertion [part] member 2 firmly in.

[Another] An alternative preferred embodiment of the indicator [part] device 20 is illustrated in [Figures] FIGS. 6–8[, which]. The indicator device is premounted on the insertion [part] member 2 ([Figure] FIG. 9) and pressed together with the latter into the insertion opening 15 of the plug housing.

[This] The indicator [part] device 20 likewise consists of two support rings 21 and 22 which, exactly like the aforementioned indicator [part]device 4, are connected via the same [elastic ridges] connection portion having webs 10 and bridging strips 11.

The support ring 21 [resting] rests against the flange 12 of the insertion [part] member 2 [possesses] and has two support [ridges] resilient arms 23 formed on its inside rim so as to [spring up and pointing] point in the direction of the other support ring 22[, which support ridges]. The support arms 23 first bend apart when the indicator [part] device 20 is pressed onto the insertion [part] member 2 and, after passing over the retaining [rib] ring 3, spring back together again [and]. The arms 23 also engage [with] the catch edges 24 behind and upstream of the retaining [rib] ring 3. [For this purpose, the] The support [ridges] arms 23 have a length L which corresponds exactly to the spacing (a) between flange 12 and retaining [rib] ring 3. In order to guarantee good contact on the tubular [jacket] surface 25 of the insertion [part] member 2, it is also provided that the inside diameter of the arms in the area of the support edge 24 is somewhat smaller than the outer diameter R of the insertion [part] member 2.

For secure engagement of the insertion [part] member 2, it is also provided that the outer diameter D of the support [ridges] arms 23 in the area in front of the support edge 24 is smaller than the outer diameter H of the retaining [ridge] ring 3, so that sufficient contact surface remains for reaching being the catch edges 7 of the retaining [element] member 6 behind the retaining [rib] ring 3.

Since the inner rim of the support ring 21 must be somewhat larger in diameter than the outer diameter H of the retaining rib 3, the support, [ridges] arms 23 are formed such that they first taper conically inwards from the inner rim of the support ring 21 and continue on parallel to the tubular [jacket] surface 25 after roughly half the length L of the support ridges 23.

Also for optimal contact of the support [ridges] arms 23 on the tubular [jacket] surface 25, the area in front of the support edge 24 is formed such that the inner wall of the support [ridge] arms 23 [against runs conically] extends inwardly somewhat conically [inwards].

[The] Advantageously, the support ring 22 [expediently] has a centering sleeve 26 [pointing] extending towards the plug housing 1 which fits exactly into the insertion opening 15 upon introduction of the insertion [part] member 2 into the plug housing 1.

What is claimed is:

1. An indicator device for use with a detachable plug assembly having a tubular insert member and a plug housing, the tubular member having a circumferential ring disposed between an end and an annular flange, the plug housing having a retaining element having at least one edge portion for engaging said insert member when said tubular member is inserted into a cavity of said plug;

said indicator device comprising a pair of elongated connecting portions extending in an axial direction between a pair of rings, each of said connecting portions having a bridging strip which folds together in an arc to project in a direction radially outwardly from said rings when said at least one edge portion of said retaining member engages said ring of said tubular member in said locked position, said pair of rings positioned between said flange of said insert member and said plug housing.

2. The indicator device of claim 1, wherein each said connection portions comprise an outwardly curved bridging portion extending between a pair of resilient web portions.

3. The indicator device of claim 2, wherein said bridge straps have a predetermined width and flexibility which is less than a width and flexibility of said webs.

4. The indicator device of claim 1, further comprising a pair of retaining projections extending in an axial direction and having catch tabs for engaging retaining pockets formed on said plug housing.

5. The indicator device of claim 1, further comprising at least two support arms extending from one of said rings toward an other of said rings, said arm having a predetermined length equal to the distance between said flange and said retaining ring of said insert member.

6. The indicator device of claim 5, wherein said support arms have edges having a predetermined diameter which is smaller than an outside diameter of said retaining ring.

7. The indicator device of claim 5, wherein said support arms further comprise an inner portion which tapers inwardly from said one ring, said inner portion extending generally one-half of said predetermined length, and an outer portion extending in an axial direction.

8. The indicator device of claim 5, wherein said arms have a conical portion adjacent said edges.

* * * * *

UNITED STATES PATENT AND TRADEMARK OFFICE
CERTIFICATE OF CORRECTION

PATENT NO.   : 6,089,616
DATED        : July 18, 2000
INVENTOR(S)  : Trede et al.

It is certified that error appears in the above-identified patent and that said Letters Patent is hereby corrected as shown below:

<u>Title page,</u>
Item [57], ABSTRACT,
Line 1, delete "A" and insert -- An --

Signed and Sealed this

Twenty-first Day of October, 2003

JAMES E. ROGAN
*Director of the United States Patent and Trademark Office*